US010241941B2

(12) United States Patent
Fader et al.

(10) Patent No.: US 10,241,941 B2
(45) Date of Patent: Mar. 26, 2019

(54) SYSTEMS AND METHODS FOR ASYMMETRIC MEMORY ACCESS TO MEMORY BANKS WITHIN INTEGRATED CIRCUIT SYSTEMS

(71) Applicant: Freescale Semiconductor, Inc., Austin, TX (US)

(72) Inventors: Joachim Fader, Munich (DE); Stephan M. Herrmann, Markt Schwaben (DE); Amit Jindal, Sonipat (IN); Nitin Singh, New Delhi (IN)

(73) Assignee: NXP USA, Inc., Austin, TX (US)

( * ) Notice: Subject to any disclaimer, the term of this patent is extended or adjusted under 35 U.S.C. 154(b) by 245 days.

(21) Appl. No.: 14/753,153

(22) Filed: Jun. 29, 2015

(65) Prior Publication Data

US 2016/0378695 A1 Dec. 29, 2016

(51) Int. Cl.
*G06F 13/16* (2006.01)
*G06F 13/28* (2006.01)
*G06F 13/40* (2006.01)

(52) U.S. Cl.
CPC ...... *G06F 13/1684* (2013.01); *G06F 13/1678* (2013.01); *G06F 13/1689* (2013.01); *G06F 13/28* (2013.01); *G06F 13/4068* (2013.01)

(58) Field of Classification Search
CPC .......... G06F 13/1684; G06F 13/1678; G06F 13/1689; G06F 13/28; G06F 13/4068
See application file for complete search history.

(56) References Cited

U.S. PATENT DOCUMENTS 4,928,234 A * 5/1990 Kitamura ............ G06F 13/1647
711/150
7,373,453 B2 5/2008 Kang
(Continued)

FOREIGN PATENT DOCUMENTS

EP 2264609 A1 12/2010
WO WO2010/011534 1/2010

OTHER PUBLICATIONS

Arm, "PrimeCell Static Memory Controller (PL092)" Technical Reference Manual, Revision: r1p3, 120 pgs. (2003).
(Continued)

*Primary Examiner* — Henry Tsai
*Assistant Examiner* — John B Roche

(57) ABSTRACT

Methods and systems are disclosed for asymmetric memory access to memory banks within integrated circuit (IC) systems. Disclosed embodiments include a memory and a memory controller within an integrated circuit. The memory includes a number of different memory banks, and the memory controller includes a number of different access ports coupled to the memory banks. The memory controller is also configured to provide asymmetric memory access for access requests to memory banks based upon access ports used for memory access requests. Additional disclosed embodiments further use asymmetric access times or asymmetric access bandwidths to provide this asymmetric access to memory banks within system memories for integrated circuit (IC) systems. By providing asymmetric access times or bandwidths for multiple access ports within a memory controller to multiple different memory banks within a system memory, overall access latency or system cost is reduced for the IC systems.

20 Claims, 6 Drawing Sheets

(56) References Cited

U.S. PATENT DOCUMENTS

| | | | |
|---|---|---|---|
| 7,623,365 B2 | 11/2009 | Jeffeloh | |
| 8,683,149 B2 | 3/2014 | Ware et al. | |
| 8,880,818 B2 | 11/2014 | Ware et al. | |
| 2002/0174313 A1* | 11/2002 | Kuhn | G06F 13/161 |
| | | | 711/167 |
| 2003/0115403 A1 | 6/2003 | Bouchard et al. | |
| 2010/0325368 A1* | 12/2010 | O'Brien | G06F 13/1652 |
| | | | 711/147 |
| 2011/0131360 A1* | 6/2011 | Noeldner | G06F 12/00 |
| | | | 710/308 |
| 2012/0265916 A1* | 10/2012 | Nordstrom | G06F 13/385 |
| | | | 710/308 |
| 2012/0331197 A1* | 12/2012 | Campbell | G06F 13/1631 |
| | | | 710/117 |
| 2013/0021858 A1* | 1/2013 | Chachad | G11C 7/1039 |
| | | | 365/194 |
| 2013/0297865 A1* | 11/2013 | Gupta | G11O 5/066 |
| | | | 711/105 |
| 2014/0101354 A1 | 4/2014 | Liu et al. | |

OTHER PUBLICATIONS

Extended Search Report for the International application No. EP 16173412.4 dated Dec. 1, 2016.
Young Hoon Son et al.: "Reducing Memory Access Latency with Asymmetric DRAM Bank Organizations", Computer Architecture, ACM, New York, NY, USA, Jun. 23, 2013, pp. 380-391, XP058021255.

\* cited by examiner

SYSTEMS AND METHODS FOR ASYMMETRIC MEMORY ACCESS TO MEMORY BANKS WITHIN INTEGRATED CIRCUIT SYSTEMS

TECHNICAL FIELD

This technical field relates to memory controllers for system memories within integrated circuits and, more particularly, to memory controllers having multiple memory access ports for such system memories.

BACKGROUND

In many current semiconductor integrated circuit (IC) systems, memory access and processing delays on paths in the IC systems are more and more dominated by the routing of electrical connections within the IC systems. For example, when relatively large memories are included within an IC system, these large memories are often implemented using multiple memory banks where wire lengths become long and eventually require registers to break access timing. In addition, existing on-die memory accesses typically require the same latency for all memory banks within such large system memories. As such, access latency typically increases with memory size as the number of clock cycles used for memory accesses are typically selected to cover the maximum access latency experienced for the different memory banks. Further, a system memory (e.g., system random access memory (RAM)) and related memory controller often serve many bus masters within the IC system, and the memory controller often includes many bus ports to the bus masters and many access ports to the system memory in order to allow parallel access by the bus masters to the system memory. As the complexities of such IC systems increase, the access logic also becomes more complex, and maximum access latency for the system memory increases significantly. As a result, system performance suffers due to increased access latency as the number of bus ports and the number of memory access ports increase with larger IC systems.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Methods and systems are disclosed for asymmetric memory access to memory banks within integrated circuit (IC) systems. The disclosed embodiments provide asymmetric access techniques including asymmetric access times or asymmetric access bandwidths that are used to provide asymmetric access to memory banks within system memories for integrated circuit (IC) systems. In contrast with traditional system memories where memory banks are accessed using the same access timing or bandwidths, the disclosed embodiments provide different and therefore asymmetric access timing or bandwidths based upon the access port being used to access a memory bank. For traditional system memories, larger memory sizes lead to increased latency as the increased size leads to longer physical routing and potential register breaks that increase access latency for accesses from certain access ports to certain memory banks that are physically separated by relatively large distances within the circuitry for the IC system. In contrast, the asymmetric access techniques described herein allow for system memories to be increased in size without degrading system performance as much as traditional system memories due to increases in maximum access latency times. By providing asymmetric access times or bandwidths for multiple access ports within a memory controller to multiple different memory banks within a system memory such that access times or bandwidth are not required to be equal as in traditional IC systems, overall average access latency for the disclosed embodiments is reduced even though access latencies from a particular access port to a particular memory bank can be relatively large due to the increased size of the system memory. As system memories increase in size and associated memory controllers increase in complexity, the latency reductions achieved by the asymmetric access techniques described herein are significant as compared to prior systems that implement equal access latency schemes to system memories. A variety of additional or different features and variations can also be implemented.

Figure 1:
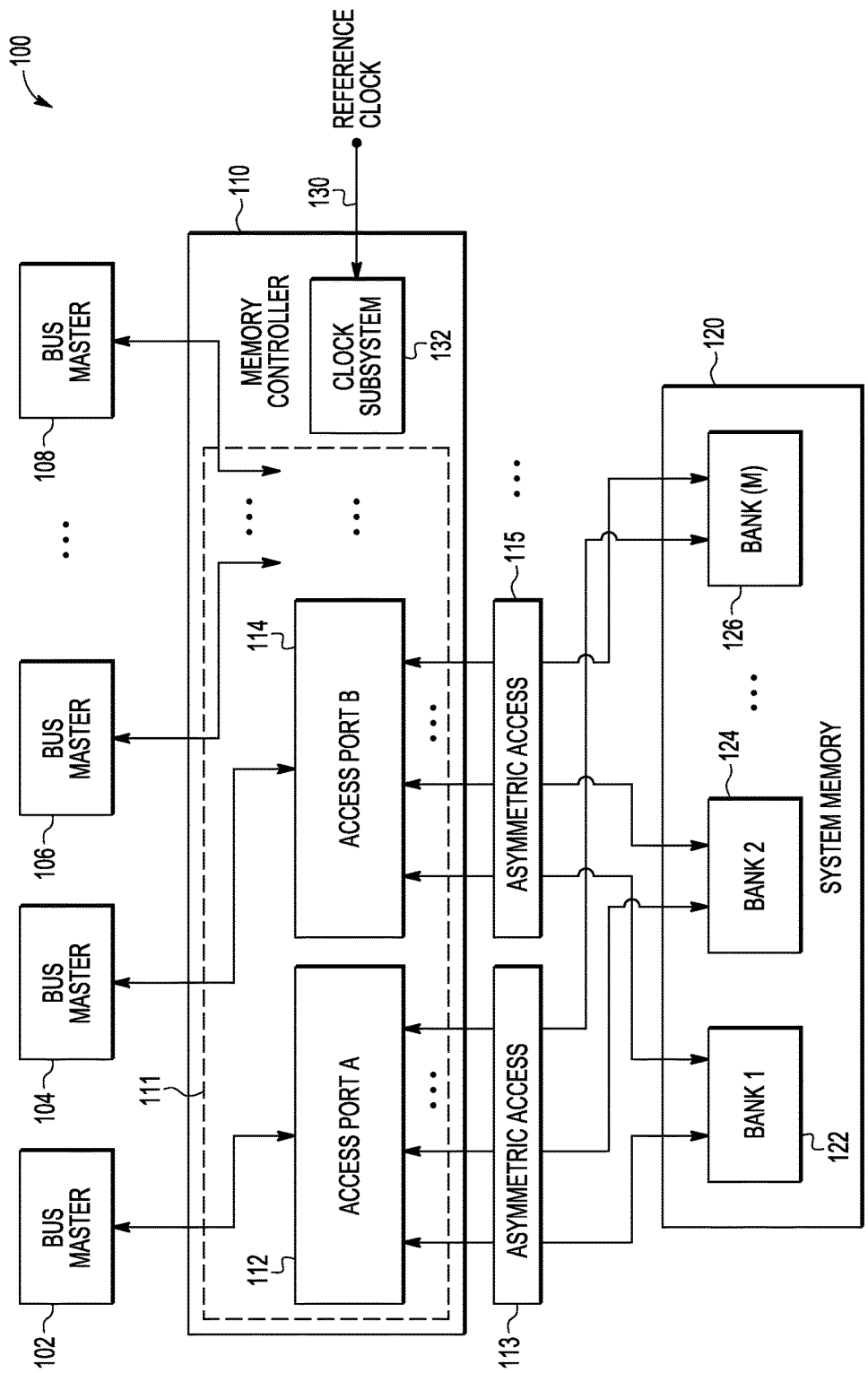
FIG. 1 is a block diagram of an example embodiment for asymmetric memory access to memory banks for a system memory within an integrated circuit (IC) system.

FIG. 1 is a block diagram of an example embodiment 100 for asymmetric memory access to memory banks 122, 124 . . . 126 for a system memory 120 within an integrated circuit (IC) system. The system memory 120 is coupled to bus masters 102, 104, 106 . . . 108 through a memory controller 110. The memory controller 110 includes two or more access ports 111 that are coupled to the system memory 120 and that are used to access the system memory 120. The system memory 120 includes multiple different memory banks 122, 124 . . . 126. The memory controller 110 receives memory access requests from the bus masters 102, 104, 106 . . . 108, which can be parallel memory access requests, and these access requests are received by an access port associated with the requesting bus master 102, 104, 106 . . . 108. For example, a first access port (ACCESS PORT A) 112 is associated with the first bus master 102; a second access port (ACCESS PORT B) 114 is associated with a second bus master 104; and so on with other access ports being associated with the additional bus masters 106 . . . 108. The memory controller 110 can also include a clock subsystem 132 configured to generate one or more clock signals for operation of the memory controller 110, and these clock signals can be based upon a reference clock 130 within the IC system that is received by the memory controller 110. It is further noted that the memory controller 110 and the system memory 120 as well as the bus masters 102, 104, 106 . . . 108 can be integrated within a single integrated circuit that provides an IC system.

Each of the access ports 112 and 114, as well as each other access port included within access ports 111, are configured to provide asymmetric access 113/115 for memory access and related memory operations (e.g., memory read operations, memory write operations) with respect to the different memory banks 122, 124 . . . 126 within the system memory 120. Although not shown, additional connections similar to the connections from access ports 112/114 to memory banks 122, 124 . . . 126 would be included for each access port included within the access ports 111, and asymmetric access would also be provided for memory accesses by these additional access ports. For example, asymmetric access times as described further with respect to FIGS. 2A-B and FIG. 3 below can be used to provide this asymmetric access, and asymmetric access bandwidths as described with respect to FIGS. 4-5 can be used to provide this asymmetric access. Further, combinations of asymmetric access times and asymmetric access bandwidths can be used, and additional or different asymmetric techniques can also be used, as desired.

It is noted that the bus masters 102, 104, 106 . . . 108 can be any processing circuitry within the IC system that is configured to access system memory 120 through memory controller 110 using one or more interconnection buses between the bus masters 102, 104, 106 . . . 108 and the memory controller 110. For example, the bus masters 102, 104, 106 . . . 108 can be one or more CPUs (central processing units), processing cores within one or more CPUs, or other processing circuitry within the IC system. When a particular bus master, such as bus master 102, is sending data to or receiving data from the memory controller 110, this particular bus master will typically have control of the interconnection bus through which the data is being communicated. A variety of shared buses or dedicated buses can be provided for these interconnection buses, as desired. It is further noted that the memory controller 110 including the access ports 111 and the clock subsystem 132, as well as the bus masters 102, 104, 106 . . . 108, can be implemented within an integrated circuit (IC) using one or more processing devices including controllers, microcontrollers, processors, microprocessors, hardware accelerators, configurable logic devices (e.g., field programmable gate arrays), or other processing devices. Further, the one or more processing devices can execute instructions stored in a non-transitory tangible computer-readable medium to perform the functions described herein. It is further noted the system memory 120 can be implemented as any desired non-transitory tangible computer-readable medium. Such computer-readable mediums can include, for example, data storage devices, FLASH memory, random access memory, read only memory, programmable memory devices, reprogrammable storage devices, hard drives, floppy disks, DVDs, CD-ROMs, or any other non-transitory data storage mediums. Other variations could also be implemented.

Figure 2A:
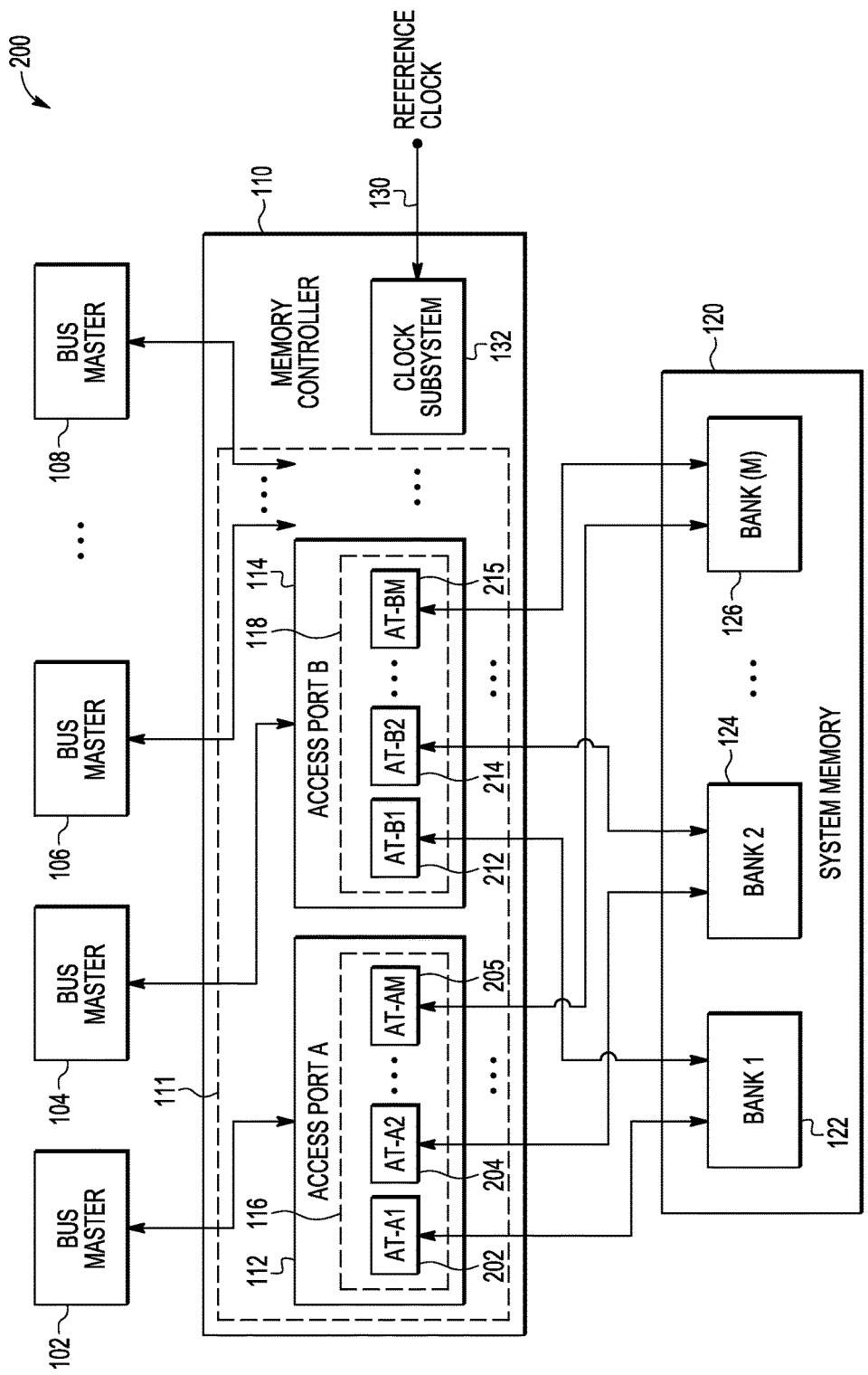
FIG. 2A is a block diagram of an example embodiment for asymmetric memory access within an integrated circuit (IC) system where asymmetric memory access times are used.

FIG. 2A is a block diagram of an example embodiment 200 for asymmetric memory access within an integrated circuit (IC) system where asymmetric memory access times are used. As with embodiment 100 of FIG. 1, a system memory 120 is coupled to bus masters 102, 104, 106 . . . 108 through a memory controller 110. The memory controller 110 includes two or more access ports 111 that are coupled to the system memory 120 and that are used to access the system memory 120. The system memory 120 includes multiple different memory banks 122, 124 . . . 126. The memory controller 110 receives memory access requests from the bus masters 102, 104, 106 . . . 108, which can be parallel memory access requests, and these access requests are received by an access port associated with the requesting bus master 102, 104, 106 . . . 108. For example, a first access port (ACCESS PORT A) 112 is associated with the first bus master 102; a second access port (ACCESS PORT B) 114 is associated with a second bus master 104; and so on with other access ports being associated with the additional bus masters 106 . . . 108. The memory controller 110 can also include a clock subsystem 132 configured to generate one or more clock signals for operation of the memory controller 110, and these clock signals can be based upon a reference clock 130 within the IC system that is received by the memory controller 110.

For embodiment 200, each of the access ports 112 and 114, as well as each other access port included within access ports 111, is configured to use a set of asymmetric access times for memory access and related memory operations with respect to the different memory banks 122, 124 . . . 126 within the system memory 120. For example, the first access port (ACCESS PORT A) 112 includes a set of access times 116 with an access time being associated with each of the M different memory banks 122, 124 . . . 126 within system memory 120. In particular, a first access time (AT-A1) 202 is associated with the first bank (BANK1) 122; a second access time (AT-A2) 204 is associated with the second bank (BANK2) 124; and so on with an Mth access time (AT-AM) 205 being associated with the Mth bank (BANK(M)) 126. Similarly, a second access port (ACCESS PORT B) 114 includes a set of access times 118 with an access time being associated with each of the M different memory banks 122, 124 . . . 126 within system memory 120. In particular, a first access time (AT-B1) 212 is associated with the first bank (BANK1) 122; a second access time (AT-B2) 214 is associated with the second bank (BANK2) 124; and so on with an Mth access time (AT-BM) 215 being associated with the Mth bank (BANK(M)) 126. Additional access ports within access ports 111 for memory controller 110 can similarly be configured to include different sets of access times including separate access times for the different memory banks 122, 124 . . . 126 within the system memory 120.

In operation, the asymmetric access times 202, 204 . . . 205 and 212, 214 . . . 215 and so on for each access port 111 are used to access the different banks 122, 124 . . . 126 and thereby provide asymmetric memory access to the different memory banks 122, 124 . . . 126 within the system memory 120. To initiate memory operations to system memory 120, the bus masters 102, 104, 106 . . . 108 issue memory access requests (e.g., memory read requests, memory write requests) to memory controller 110. The access port 111 associated with the requesting bus master 102, 104, 106 . . . 108, then accesses the requested memory bank 122, 124 . . . 126 within the system memory 120. Based upon the memory bank 122, 124 . . . 126 that will be accessed, the appropriate access time 202, 204 . . . 205 and 212, 214 . . . 215 from the sets of access times 116/118 for the access ports 111 is used for the memory access.

As described herein, memory banks 122, 124 . . . 126 that are physically closer to a particular access port are preferably accessed using a shorter access time than memory banks 122, 124 . . . 126 that are physically further from that particular access port. For example, access port (ACCESS PORT A) 112 can be configured to use an access time (AT-A1) 202 for a first memory bank (BANK1) 122 that is physically closer within the IC system as compared to an access time (AT-AM) 205 for an Mth memory bank (BANKM) 126 that is physically further away within the IC system. Thus, assuming a first memory bank is physically closer to an access port than a second memory bank, the access time applied for this first memory bank can be shorter than the access time applied for this second memory bank. As further described herein, the access times can represent different numbers of clock cycles that are being used for memory accesses and related memory operations. For example, a memory access to a memory bank that is physically closer to an access port can use fewer clock cycles than would be used for a memory access to a memory bank that is physically further from the access port. Thus, each of the sets of asymmetric access times 116/118 can represent different numbers of clock cycles that are used for memory access and related memory operations. For example, 1-2 clock cycles for a clock signal generated by the clock subsystem 132 could be used to access a memory bank that is physically close to an access port, while 3-4 clock cycles could be used to access a memory bank that is physically far from an access port. Other clock timing variations could also be implemented. As described herein, by providing different and therefore asymmetric access timing from the access ports to memory banks, overall system latency is reduced as compared to prior solutions when system memory sizes are increased.

Figure 2B:
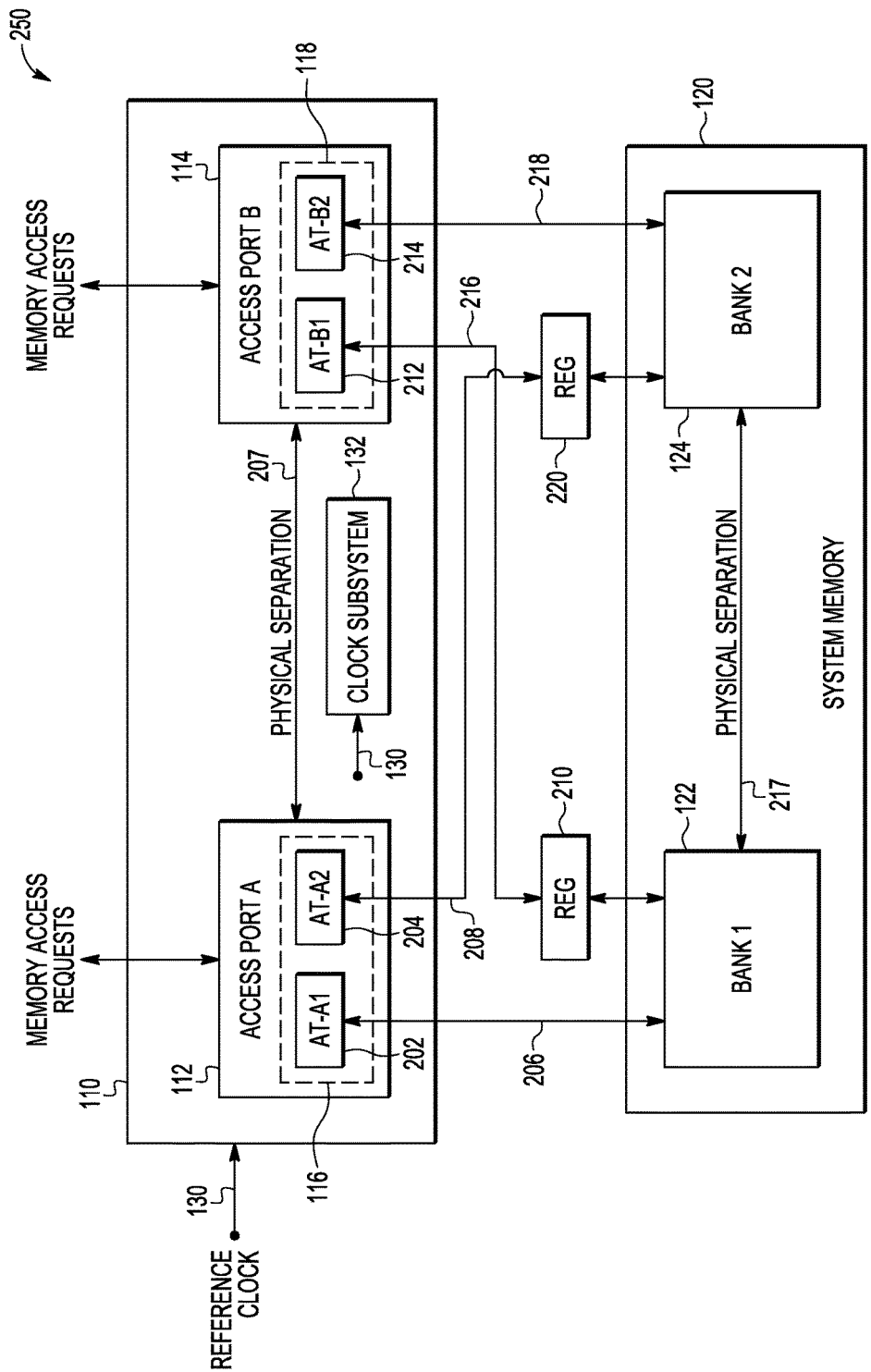
FIG. 2B is a block diagram of an example embodiment for the embodiment of FIG. 2A where the integrated circuit (IC) system includes two access ports within a memory controller and two memory banks within a system memory.

FIG. 2B is a block diagram of an example embodiment 250 for asymmetric memory access within an integrated circuit (IC) system including two access ports 112/114 within the memory controller 110 and two memory banks 122/124 within the system memory 120. For this example embodiment, it is assumed that the access ports 112/114 are physically separated within the circuitry for the IC system as represented by arrow 207. Similarly, for this example embodiment, it is assumed that the memory banks 122/124 are also physically separated within the circuitry for the IC system as represented by arrow 217. The physical separations 207/217 lead to longer access times being needed for memory accesses from the first access port (ACCESS PORT A) 112 to second memory bank (BANK2) 124 and for memory accesses from the second access port (ACCESS PORT B) 114 to first memory bank (BANK1) 122. Further, because of the physical separations 207/217 within the integrated circuit for the example embodiment 250, it is assumed that register circuitry 220 is included between the connection 208 from the first access port 112 to the second memory bank 124, and it is assumed that register circuitry 210 is included between the connection 218 from the second access port 114 to the first memory bank 122.

In operation, a first access time (AT-A1) 202 is used for memory accesses from the first access port 112 through connection 206 to the first memory bank 122, and a second access time (AT-A2) 204 is used for memory accesses from the first access port 112 through connection 208 to the second memory bank 124. The second access time (AT-A2) 204 for the first access port 112 will be longer (e.g., more clock cycles) than the first access time (AT-A1) 202 for the first access port 112 due to the physical separations 207/217 and intervening circuitry such as register circuitry 220. Similarly, a first access time (AT-B1) 212 is used for memory accesses from the second access port 114 through connection 216 to the first memory bank 122, and a second access time (AT-B2) 214 is used for memory accesses from the second access port 114 through connection 218 to the second memory bank 124. The first access time (B1) 212 for the second access port 114 will be longer (e.g., more clock cycles) than the second access time (B2) 214 for the second access port 114 due to the physical separations 207/217 and intervening circuitry such as register circuitry 210.

It is noted that the example embodiment 250 provides a relatively simple example of a memory controller 110 with two access ports 112/114 and a system memory 120 with two memory banks 122/124. More complex implementations could have many more access ports or many more memory banks. For the example embodiment 250, it is also noted that both memory banks 122/124 can be accessed from either of the access ports 112/114. Further, the access requests to the access ports 112/114 can be configured to indicate which memory bank 122/124 will be accessed based upon memory addresses including within the access requests that determine the memory bank 122/124 to be accessed. In other embodiments, the memory controller 110 can be configured to dynamically assign resources, such as the memory bank 122/124 to be accessed, based upon the access requests. For example, logic circuitry associated with each access port 112/114 can be configured to select which physical bank 122/124 will be accessed for a particular memory access request. As such, the access ports 112/114 effectively provide an address translation between a logical memory address included within access requests received by the access ports 112/114 from bus masters and the actual physical memory address applied to system memory 120 to access one of the memory banks 122/124. As one further example to allow for lower overall latency, the first access port 112 can be configured to primarily access and use the first memory bank 122 for access requests, and the first access port 112 can be configured to access and use the second memory bank 124 with less frequency. Overall latency is lower because the accesses from the first access port 112 to the first memory bank 122 use a shorter access time as compared to accesses from the first access port 112 to the second memory bank 124 and are not required to pass through register circuitry 220 due to the physical separations 207/217. Similarly, the second access port 114 can be configured to primarily access and use the second memory bank 124 for access requests, and the second access port 114 can be configured to access and use the first memory bank 122 with less frequency. Again, overall latency is reduced because the accesses from the second access port 114 to the second memory bank 124 use a shorter accessing time as compared to accesses from the second access port 114 to the first memory bank 122 and are not required to pass through register circuitry 210 due to the physical separations 207/217.

During operation as described herein, asymmetric memory accesses are provided to the memory banks 122/124 such that overall system latency is reduced as compared to prior systems that always use the same latency for access responses from different banks based upon the maximum required latency for the slowest memory bank access. The connection 206 from the first access port 112 to the first memory bank 122 has a shorter physical distance or less arbitration logic from intervening circuitry (e.g., register circuitry 220) as compared to connection 208 to the second memory bank 124. As such, a first access time (AT-A1) 202 with lower latency (e.g., fewer clock cycles) can be used for accesses from the first access port 112 to the first memory bank 122 as compared to the second access time (AT-A2) 204 used for accesses form the first access port 112 to the second memory bank 124. Similarly, the connection 218 from the second access port 114 to the second memory bank 124 has a shorter physical distance or less arbitration logic from intervening circuitry (e.g., register circuitry 210) as compared to connection 216 to the first memory bank 122. As such, a second access time (AT-B2) 214 with lower latency (e.g., fewer clock cycles) can be used for accesses from the second access port 114 to the second memory bank 124 as compared to the first access time (AT-B1) 212 used for accesses form the second access port 114 to the first memory bank 122. As indicated above, the access times 202/204/212/214 can represent numbers of clock cycles that are used to perform memory operations, and the faster access times 202/214 can represent fewer clock cycles that are applied to perform the memory operations as compared to the slower access times 204/212. By providing asymmetric memory access to the different memory banks 122/124, the overall system latency can be reduced thereby improving system performance.

Figure 3:
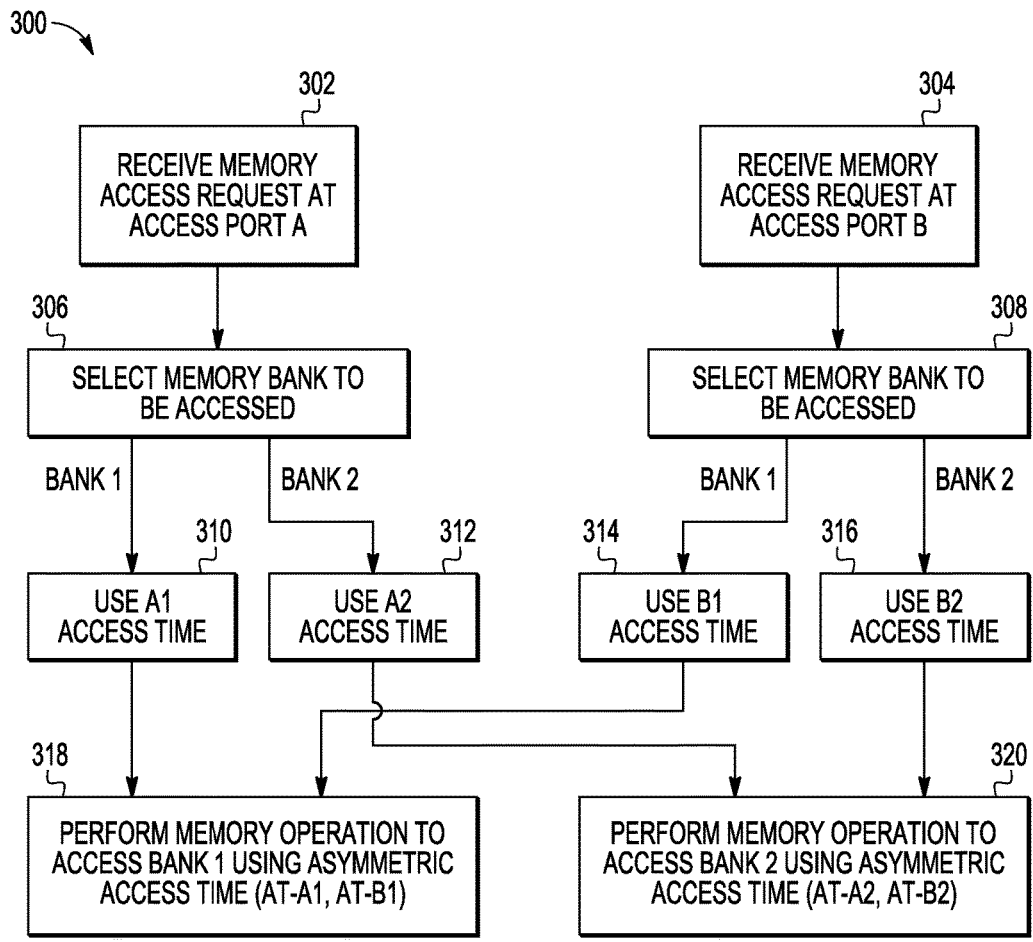
FIG. 3 is a process diagram of an example embodiment for asymmetric memory access according to the embodiment of FIG. 2B.

FIG. 3 is a process diagram of an example embodiment 300 for asymmetric memory access according to the embodiment of FIG. 2B where a memory controller 110 for an IC system includes two access ports 112/114 and two memory banks 122/124. In block 302, a first memory access request is received at a first access port (ACCESS PORT A) 112. In block 304, a second memory access request, which can be a parallel memory request, is received at a second access port (ACCESS PORT B) 114. From receipt of the first memory request in block 302, flow passes to block 306 where the memory bank to be accessed is selected. If the first memory bank (BANK1) 122 is selected in block 306, flow passes to block 310 where the first access time (AT-A1) 202 is used for the memory operation in block 318. If the second memory bank (BANK2) 124 is selected in block 306, flow passes to block 312 where the second access time (AT-A2) 204 is used for the memory operation in block 320. Looking back to block 304, after receipt of the second memory request, flow passes to block 308 where the memory bank to be accessed is selected. If the first memory bank (BANK1) 122 is selected in block 308, flow passes to block 314 where the first access time (AT-B1) 212 is used for the memory operation in block 318. If the second memory bank (BANK2) 124 is selected in block 308, flow passes to block 316 where the second access time (AT-B2) 214 is used for the memory operation in block 320.

As described above, the first access time (AT-A1) 202 for the first access port (ACCESS PORT A) 112 has lower latency than the first access time (AT-B1) 212 for the second access port (ACCESS PORT B) 114. Thus, when a memory operation is performed in block 318 to access the first memory bank (BANK1) 122, asymmetric access times are used because the first access time (AT-A1) 202 and the first access time (AT-B1) 212 are different from each other. Similarly, the second access time (AT-B2) 214 for the second access port (ACCESS PORT B) 114 has lower latency than the second access time (AT-A2) 204 for the first access port (ACCESS PORT A) 112. Thus, when a memory operation is performed in block 320 to access the second memory bank (BANK2) 124, asymmetric access times are used because the second access time (AT-A2) 204 and the second access time (AT-B2) 214 are different from each other. By providing asymmetric access times 202/204/212/214 depending upon the access port 212/214 and the memory bank 122/124 to be used for the memory access, overall system latency is reduced thereby improving overall system performance.

Figure 4:
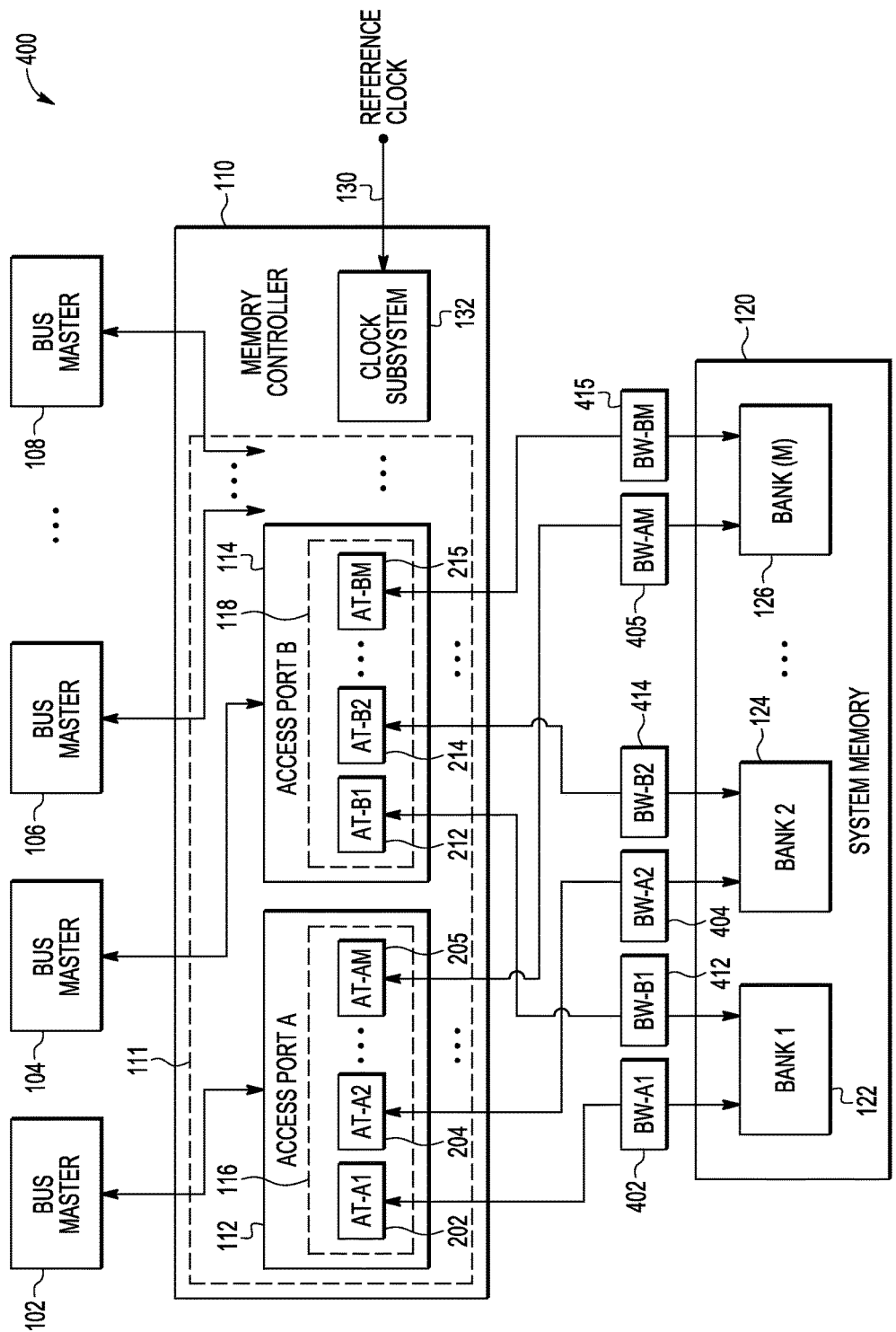
FIG. 4 is a block diagram of an example embodiment for asymmetric memory access within an integrated circuit (IC) system where asymmetric access bandwidths are used.

FIG. 4 is a block diagram of an example embodiment 400 for asymmetric memory access within an integrated circuit (IC) system where asymmetric access bandwidths are applied. Embodiment 400 is similar to embodiment 200 of FIG. 2A in that asymmetric memory access can be provided through sets of asymmetric access times 116/118 for different access ports 111 within the memory controller 110. In contrast with embodiment 200, however, embodiment 400 includes asymmetric access bandwidths for connections between the access ports 111 and the different memory banks 122, 124 . . . 126 within the system memory 120. It is noted that asymmetric access bandwidths can be implemented alone without implementing asymmetric access times, if desired, or can be implemented in combination with asymmetric access times. Other variations could also be implemented.

For the example embodiment 400, a first access bandwidth (BW-A1) 402 is provided for the connection between the first access port (ACCESS PORT A) 112 and the first memory bank (BANK1) 122; a second access bandwidth (BW-A2) 404 is provided for the connection between the first access port (ACCESS PORT A) 112 and the second memory bank (BANK2) 124; and so on with an Mth access bandwidth (BW-AM) 405 being provided for the connection between the first access port (ACCESS PORT A) 112 and the Mth memory bank (BANK(M)) 126. Similarly, a first access bandwidth (BW-B1) 412 is provided for the connection between the second access port (ACCESS PORT B) 114 and the first memory bank (BANK1) 122; a second access bandwidth (BW-B2) 414 is provided for the connection between the second access port (ACCESS PORT B) 114 and the second memory bank (BANK2) 124; and so on with an Mth access bandwidth (BW-BM) 415 being provided for the connection between the second access port (ACCESS PORT B) 114 and the Mth memory bank (BANK(M)) 126. Similar to the asymmetric access times 116/118, these memory access bandwidths can be configured such that more bandwidth is provided to memory banks 122, 124 . . . 126 that are physically closer to respective access ports 111 with the memory controller 110 as compared to less bandwidth for the connections for memory banks 122, 124 . . . 126 that are physically further from respective access ports 111 within the memory controller 110.

It is noted that the memory access bandwidths 402, 404 . . . 405 associated with first access port 112 and the memory access bandwidths 412, 414 . . . 415 associated with the second access port 114, as well as other access bandwidths associated with additional access ports within the memory controller 110, can be implemented using a variety of connection techniques. For example, the memory access bandwidths can be implemented, for example, through selection of clock frequencies used for clock signals that drive data signals through the connections from the memory controller 110 to the system memory 120, through the size of the data paths for the connections between the memory controller 110 and the system memory 120, through sharing of data paths among access ports, or through other bandwidth control techniques. For example, a faster clock frequency can be used for clock signals that drive data between closer memory banks such as between the first access port 112 and the first memory bank 122 as compared to a slower clock frequency being used for data accesses between the first access port 112 and the Mth memory bank 126. Similarly, a wider data path (e.g., larger number of signal lines within a connection bus) can be used for data communicated between closer memory banks such as between the first access port 112 and the first memory bank 122 as compared to a smaller data path for data communicated between the first access port 112 and the Mth memory bank 126. Further, a group of access ports can have separate data paths to closer memory banks and then share a data path to a memory bank that is physically further away. For example, access ports 112/114 can have separate data paths to closer memory banks such as the first and second memory banks 122/124, and access ports 112/114 can then share a data path to a memory bank that is physically further away, such as the Mth memory bank 126. As one further example for such a shared data path, a multiplexer can be connected to received data path connections from each of the access ports 112/114 and then provide a single data path connection to the Mth memory bank 126, and a control signal from the memory controller 110 to the multiplexer can be configured to determine which input to the multiplexer is connected to its output. Other variations and bandwidth control techniques could also be implemented. Thus, as with the asymmetric access times 116/118 for the access ports 111 within the memory controller 110, asymmetric memory access bandwidths can be used for the connections between the access ports 111 for the memory controller 110 and to the memory banks 122, 124 . . . 126 within the system memory 120. These asymmetric access bandwidths help to reduce overall system latency and thereby further improve system performance.

Figure 5:
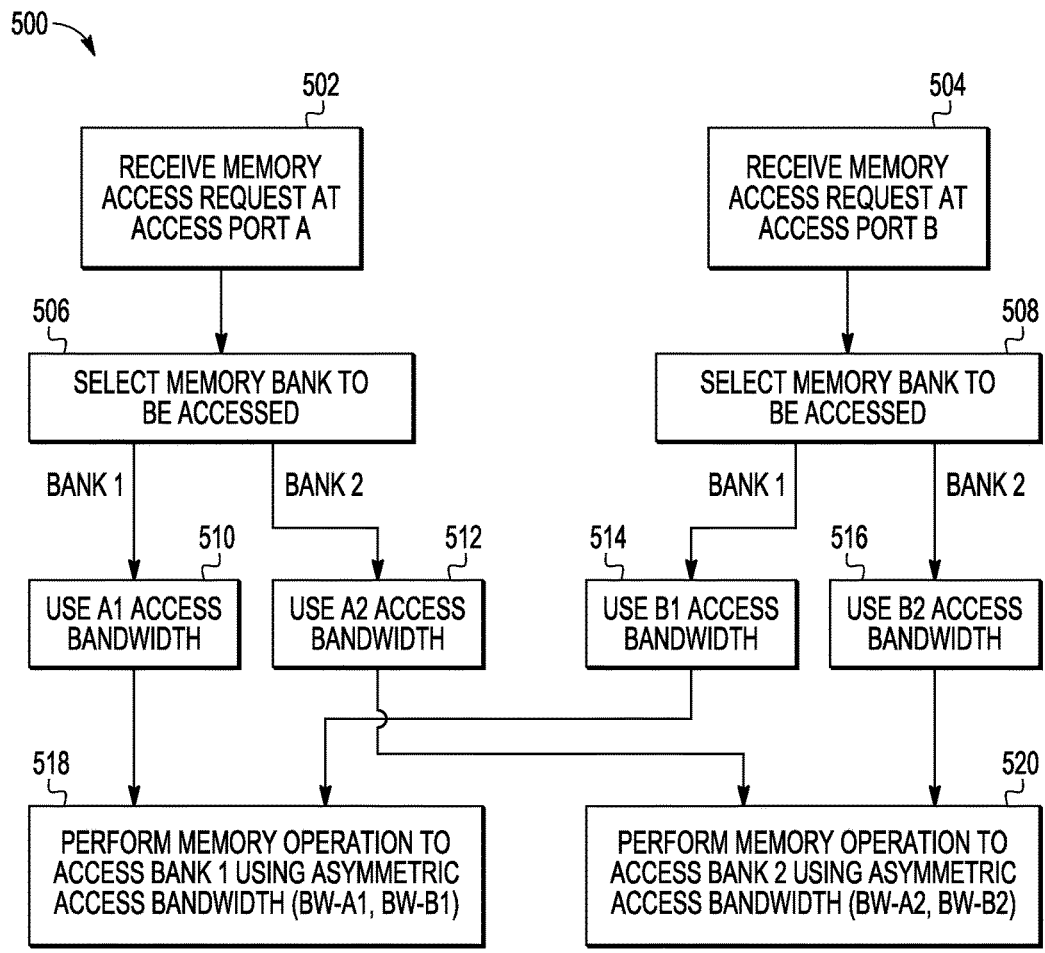
FIG. 5 is a process diagram of an example embodiment for asymmetric memory access similar to FIG. 3 except that asymmetric access bandwidths are used.

FIG. 5 is a process diagram of an example embodiment 500 for asymmetric memory access similar to embodiment 300 of FIG. 3 except that asymmetric access bandwidths are used for asymmetric memory access. In block 502, a first memory access request is received at a first access port (ACCESS PORT A) 112. In block 504, a second memory access request, which can be a parallel memory request, is received at a second access port (ACCESS PORT B) 114. From receipt of the first memory request in block 502, flow passes to block 506 where the memory bank to be accessed is selected. If the first memory bank (BANK1) 122 is selected in block 506, flow passes to block 510 where the first access bandwidth (BW-A1) 402 is used for the memory operation in block 518. If the second memory bank (BANK2) 124 is selected in block 506, flow passes to block 512 where the second access bandwidth (BW-A2) 404 is used for the memory operation in block 520. Looking back to block 504, after receipt of the second memory request, flow passes to block 508 where the memory bank to be accessed is selected. If the first memory bank (BANK1) 122 is selected in block 508, flow passes to block 514 where the first access bandwidth (BW-B1) 412 is used for the memory operation in block 518. If the second memory bank (BANK2) 124 is selected in block 508, flow passes to block 516 where the second access bandwidth (AT-B2) 414 is used for the memory operation in block 520.

During operation, the first access bandwidth (BW-A1) 402 for the first access port (ACCESS PORT A) 112 can have a different (e.g., higher) bandwidth than the first access bandwidth (BW-B1) 412 for the second access port (ACCESS PORT B) 114. Thus, when a memory operation is performed in block 518 to access the first memory bank (BANK1) 122, asymmetric access bandwidths are used because the first access bandwidth (BW-A1) 402 and the first access bandwidth (BW-B1) 412 are different from each other. Similarly, the second access bandwidth (BW-B2) 414 for the second access port (ACCESS PORT B) 114 can have a different (e.g., higher) bandwidth than the second access bandwidth (BW-A2) 404 for the first access port (ACCESS PORT A) 112. Thus, when a memory operation is performed in block 520 to access the second memory bank (BANK2) 124, asymmetric access bandwidths are used because the second access bandwidth (BW-A2) 404 and the second access bandwidth (BW-B2) 414 are different from each other. By providing asymmetric access bandwidths 402/404/412/414 depending upon the access port 212/214 and the memory bank 122/124 to be used for the memory access, overall system bandwidth is optimized thereby improving overall system cost.

As described herein, a variety of embodiments can be implemented and different features and variations can be implemented, as desired.

For one embodiment, a system for asymmetric memory access in an integrated circuit is disclosed including a memory including a plurality of memory banks and a memory controller including a plurality of access ports coupled to the memory banks where the memory controller is configured to provide asymmetric memory access for access requests to the memory banks based upon an access port to be used for each memory access request and where the memory and the memory controller are within a single integrated circuit. In additional embodiments, the memory controller is further configured to receive parallel memory access requests from a plurality of bus masters, and each bus master is associated with one of the access ports.

In further embodiments, the memory controller is configured to use at least two different memory access times to the memory banks to provide the asymmetric memory access based upon the access port to be used for each access request. In additional embodiments, the different access times include a plurality of sets of access times, each set being associated with one of the access ports. In further embodiments, each set of access times includes a separate access time for each memory bank within the memory. In still further embodiments, the different access times are associated with clock cycles for memory operations. In other embodiments, the memory controller is configured to translate logical memory addresses within access requests to physical memory addresses associated with the memory banks.

In still further embodiments, the memory controller is configured to use at least two different memory access bandwidths for connections between the access ports and the memory banks to provide the asymmetric memory access. In additional embodiments, the different memory access bandwidths include different clock frequencies for clock signals associated with the connections between the access ports and the memory banks. In further embodiments, the memory access bandwidths include at least one of different data path sizes for the connections between the access ports and the memory banks or at least one shared data path between the access ports and the memory banks.

For another embodiment, a method for asymmetric memory access in an integrated circuit is disclosed including receiving memory access requests with a memory controller to access a memory having a plurality of memory banks where the memory controller has a plurality of access ports coupled to the memory and where the memory controller and the memory are within a single integrated circuit, determining memory banks to access for the memory access requests, and asymmetrically accessing the memory banks for the memory access requests based upon an access port to be used for each memory access request. In additional embodiments, the method includes receiving parallel memory access requests from a plurality of bus masters, each bus master being associated with one of the access ports.

In further embodiments, the method includes using one of at least two different memory access times to the memory banks to provide the asymmetric accessing of the memory banks based upon an access port to be used for each memory access request. In additional embodiments, the different access times include a plurality of sets of access times with each set being associated with one of the access ports. In further embodiments, each set of access times includes a separate access time for each memory bank within the memory. In still further embodiments, the different access times are associated with clock cycles for memory operations. In other embodiments, the method further includes translating logical memory addresses within access requests to physical memory addresses associated with the memory banks.

In still further embodiments, the method includes communicating between the access ports and the memory banks using a plurality of memory access bandwidths to provide the asymmetric accessing of the memory banks. In additional embodiments, the different memory access bandwidths comprise different clock frequencies for clock signals associated with the communications between the access ports and the memory banks. In further embodiments, the memory access bandwidths include at least one of different data path sizes for the communications between the access ports and the memory banks or at least one shared data path between the access ports and the memory banks.

It is further noted that the functional blocks, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A system for asymmetric memory access in an integrated circuit, comprising:
    a memory including a plurality of memory banks; and
    a memory controller including a plurality of access ports coupled to the memory banks, the memory controller being configured to provide asymmetric memory access for access requests to the memory banks based upon an access port and a memory bank to be used for each memory access request;
    wherein, for each access port, the memory controller is further configured to provide the asymmetric memory access by selecting a memory access time from at least two different memory access times based upon the memory bank to be accessed for each access request;
    wherein the memory and the memory controller are within a single integrated circuit; and
    wherein the different memory access times for each access port are based upon physical separation between the access port and the memory banks on the single integrated circuit.

2. The system of claim 1, wherein the memory controller is further configured to receive parallel memory access requests from a plurality of bus masters, and wherein each bus master is associated with one of the access ports.

3. The system of claim 1, wherein each access port uses an intervening register to access at least one of the memory banks and also uses no intervening register to access at least one of the memory banks.

4. The system of claim 1, wherein the different access times comprise a plurality of sets of access times, each set being associated with one of the access ports.

5. The system of claim 4, wherein each set of access times comprises a separate access time for each memory bank within the memory.

6. The system of claim 1, wherein the different access times comprise different numbers of clock cycles for memory operations.

7. The system of claim 1, wherein the memory controller is configured to translate logical memory addresses within access requests to physical memory addresses associated with the memory banks.

8. The system of claim 1, wherein, for each access port, the memory controller is configured to use at least two different memory access bandwidths for connections between the access port and the memory banks to provide the asymmetric memory access based upon the memory bank to be accessed for each access request.

9. The system of claim 8, wherein the different memory access bandwidths comprise different clock frequencies for clock signals associated with the connections between each access port and the memory banks.

10. The system of claim 8, wherein the memory access bandwidths comprise at least one of different data path sizes for the connections between each access port and the memory banks or at least one shared data path between each access port and the memory banks.

11. A method for asymmetric memory access in an integrated circuit, comprising:
    receiving memory access requests with a memory controller to access a memory having a plurality of memory banks, the memory controller having a plurality of access ports coupled to the memory, and the memory controller and the memory being within a single integrated circuit;

determining, with the memory controller, memory banks to access for the memory access requests; and asymmetrically accessing, with the memory controller, the memory banks for the memory access requests based upon an access port and a memory bank to be used for each memory access request;

wherein, for each access port, the memory controller provides the asymmetric memory access by selecting a memory access time from at least two different memory access times based upon the memory bank to be accessed for each access request; and wherein the different memory access times for each access port are based upon physical separation between the access port and the memory banks on the single integrated circuit.

12. The method of claim 11, further comprising receiving parallel memory access requests from a plurality of bus masters, each bus master being associated with one of the access ports.

13. The method of claim 11, wherein each access port uses an intervening register to access at least one of the memory banks and also uses no intervening register to access at least one of the memory banks.

14. The method of claim 11, wherein the different access times comprise a plurality of sets of access times, each set being associated with one of the access ports.

15. The method of claim 14, wherein each set of access times comprises a separate access time for each memory bank within the memory.

16. The method of claim 13, wherein the different access times comprise different numbers of clock cycles for memory operations.

17. The method of claim 11, further comprising translating logical memory addresses within access requests to physical memory addresses associated with the memory banks.

18. The method of claim 11, further comprising, for each access port, communicating between the access port and the memory banks using a plurality of memory access bandwidths to provide the asymmetric accessing based upon the memory bank to be accessed for each access request.

19. The method of claim 18, wherein the different memory access bandwidths comprise different clock frequencies for clock signals associated with the communications between each access port and the memory banks.

20. The method of claim 18, wherein the memory access bandwidths comprise at least one of different data path sizes for the communications between each access port and the memory banks or at least one shared data path between each access port and the memory banks.

* * * * *